(12) United States Patent
Shin et al.

(10) Patent No.: US 8,043,583 B2
(45) Date of Patent: Oct. 25, 2011

(54) BAFFLE STRUCTURE IMPROVING HEAT TRANSFER EFFICIENCY OF REACTOR OR HEAT EXCHANGER

(75) Inventors: Sang Baek Shin, Daejeon (KR); Sang Phil Han, Daejeon (KR); Ye Hoon Im, Daejeon (KR); Young Bae Kim, Yeosu-si (KR); Jung Hoon Chang, Yeosu-si (KR); Sang Oeb Na, Yeosu-si (KR); Won Am Lee, Yeosu-si (KR)

(73) Assignee: LG Chem, Ltd., Seoul (KR)

( * ) Notice: Subject to any disclaimer, the term of this patent is extended or adjusted under 35 U.S.C. 154(b) by 885 days.

(21) Appl. No.: 11/700,056

(22) Filed: Jan. 31, 2007

(65) Prior Publication Data

US 2007/0187079 A1    Aug. 16, 2007

(30) Foreign Application Priority Data

Jan. 31, 2006  (KR) .................. 10-2006-0009405

(51) Int. Cl.
  *B01J 8/06*  (2006.01)
  *F28F 9/00*  (2006.01)
  *C07C 51/16*  (2006.01)
(52) U.S. Cl. ........ 422/651; 422/652; 422/658; 422/659; 422/202; 422/205; 165/159; 562/542
(58) Field of Classification Search .............. 422/651, 422/652, 658, 659, 202, 205; 165/159; 562/542
See application file for complete search history.

(56) References Cited

U.S. PATENT DOCUMENTS

| | | | |
|---|---|---|---|
| 3,385,268 A * | 5/1968 | Sprague ..................... 122/32 |
| 3,871,445 A | 3/1975 | Wanka et al. |
| 6,808,689 B1 | 10/2004 | Matsumoto et al. |
| 2004/0213711 A1 | 10/2004 | Ha et al. |

FOREIGN PATENT DOCUMENTS

| EP | 1 097 745 B1 | 2/2005 |
|---|---|---|
| KR | 1020010050267 A | 6/2001 |
| TW | 445365 | 7/2001 |

* cited by examiner

*Primary Examiner* — Jennifer A Leung
(74) *Attorney, Agent, or Firm* — McKenna Long & Aldridge LLP

(57) ABSTRACT

Disclosed is a shell-and-tube reactor or heat exchanger, which alternately comprises a doughnut-type baffle plate and a first disc-type baffle plate in order to increase heat transfer efficiency. In the reactor or heat exchanger, a second disc-type baffle plate is placed in an empty space inside of the doughnut-type baffle plate, and some tubes, through the inside of which a first object for heat transfer with a heat transfer medium, are present in a region inside of the doughnut-type baffle plate and outside of the second disc-type baffle plate. Also disclosed is a method for producing an oxide, comprising: using said reactor or heat exchanger, and causing a catalytic vapor-phase oxidation reaction in the tubes, through the inside of which the first object for heat transfer with the heat transfer medium is passed.

8 Claims, 4 Drawing Sheets region 9.in which reaction tubes are located

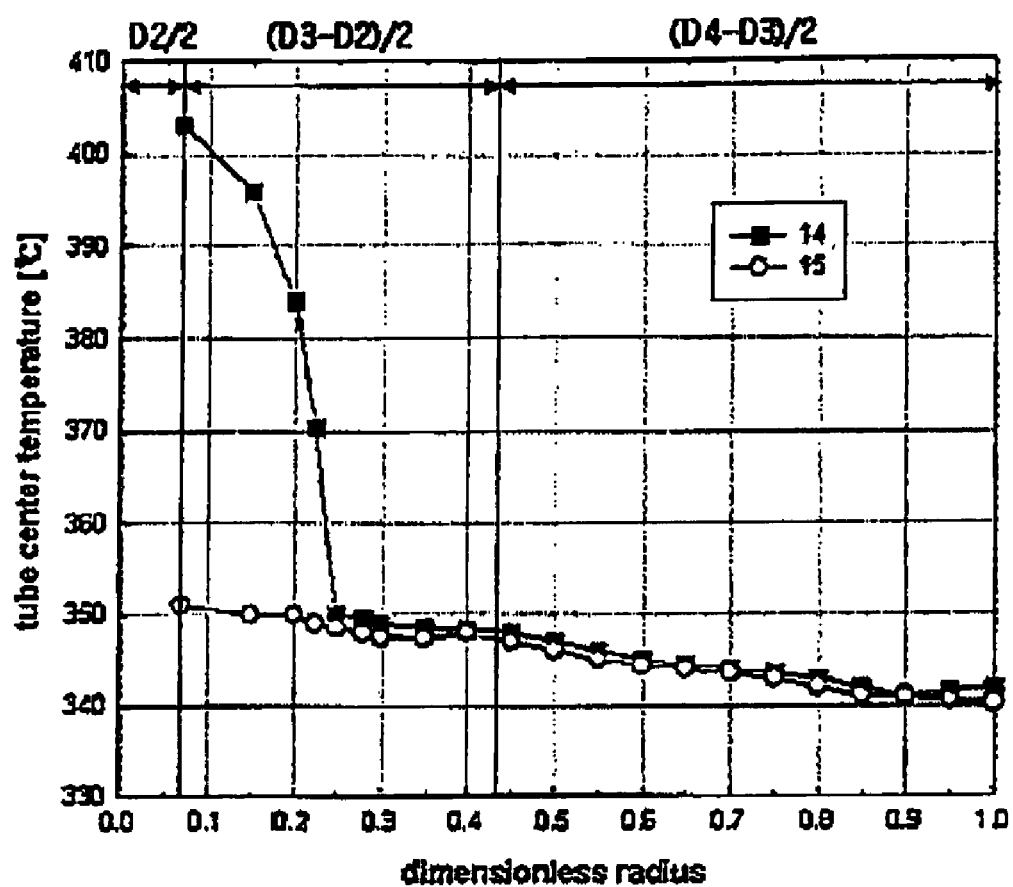

BAFFLE STRUCTURE IMPROVING HEAT TRANSFER EFFICIENCY OF REACTOR OR HEAT EXCHANGER

This application claims the benefit of the filing date of Korean Patent Application No. 2006-9405, filed on Jan. 31, 2006, in the Korean Intellectual Property Office, the disclosure of which is incorporated herein in its entirety by reference.

TECHNICAL FIELD

The present invention relates to a shell-and-tube reactor or heat exchanger alternately comprising a doughnut-type baffle plate and a first disc-type baffle plate, wherein a second disc-type baffle plate is provided in an empty space inside of the doughnut-type baffle plate, and some tubes, through the inside of which a first object for heat transfer with a heat transfer medium is passed, are placed in a region inside of the doughnut-type baffle plate and outside of the second disc-type baffle plate.

BACKGROUND ART

Generally, a shell-and-tube heat exchanger-type catalytic reactor is a kind of reactor which is used to efficiently remove reaction heat. In such a reactor, a solid catalyst is filled in a plurality of reaction tubes, reaction gas is fed into the reaction tubes to cause a chemical reaction for obtaining a desired product, and a heat transfer medium is circulated through the reactor shell such that the chemical reaction can occur in the optimal state.

In the shell-and-tube catalytic reactor, hot spots tend to occur at a local point in the reaction tubes, and such hot spots cause problems, such as the deterioration of a catalyst, leading to a reduction in catalyst life, and a reduction in the selectivity to the desired product. Thus, various methods for efficiently transferring heat to the reaction tubes in the reactor to reduce hot spots have been attempted.

Korean Patent Laid-Open Publication No. 2001-0050267, for example, discloses an attempt to improve heat transfer performance by maintaining a constant flow rate of a heat transfer medium in any region in a reactor through the use of a shell-and-tube heat exchanger, which comprises a circulator for the heat transfer medium, and doughnut-type and disc-type baffle plates, which are alternately disposed in the reactor shell. Also, circulation channels without reaction tubes are provided between a upper tube sheet and a lower tube sheet and between the peripheral portion and central portion in the cross section of the shell. Heat transfer medium can be transferred from the central portion to the peripheral portion or from the peripheral portion to the central portion through circulation channels in a shorter time than through the reaction tube region. Accordingly, the heat transfer medium passing through the circulation channel recovers only a small amount of reaction heat because of less frequent contact with the reaction tubes, such that it can reach the peripheral portion or the central portion at a relatively low temperature in a relatively short time, and thus can handle the reaction tubes in these portions with a relatively fresh condition of heat transfer medium.

DISCLOSURE OF THE INVENTION

The present inventors have found that, in a shell-and-tube reactor or heat exchanger, in which doughnut-type and disc-type baffle plates are alternately provided such that a heat transfer medium flows in an S-shape, a region having markedly reduced heat transfer coefficient is present in reaction tubes located in the central portion in which the movement direction of the heat transfer medium is changed. Also, the present inventors have found that, in the case of the reactor, abnormal hot spots attributable to a reduction in heat transfer coefficient occur in reaction tubes present in the region having markedly reduced heat transfer coefficient. Such abnormal hot spots increase possibilities for catalysts to deteriorate, leading to a reduction in catalyst life, the selectivity to the desired product to be reduced, and run-away reactions to be induced.

The present invention has been made in order to solve the above-described problem, and aims to provide a method for increasing the heat transfer coefficient of tubes in a shell-and-tube reactor or heat exchanger alternately comprising a doughnut-type baffle plate and a first disc-type baffle plate, in which the tubes are provided in a region inside of the doughnut-type baffle plate, the region having present therein a flow of heat transfer medium parallel to the axis of the tubes (parallel flow), and in which a first object for heat transfer with the heat transfer medium is passed through the inside of the tubes, the method comprising placing a second disc-type baffle plate in said region to increase the flow rate of the parallel flow.

The present invention provides a shell-and-tube reactor or heat exchanger alternately comprising a doughnut-type baffle plate and a first disc-type baffle plate, wherein a second disc-type baffle plate is placed in an empty space inside of the doughnut-type baffle plate, and some tubes, through the inside of which a first object for heat transfer with a heat transfer medium is passed, are present in a region inside of the doughnut-type baffle plate and outside of the second disc-type baffle plate.

In the reactor or heat exchanger according to the present invention, the diameter D1 of the second disc-type baffle plate is preferably adjusted in a range of 5-25% of the inner diameter D4 of the shell of the reactor or heat exchanger, and more preferably 10-20% of the inner diameter D4.

The inside diameter D3 of the doughnut-type baffle plate is preferably adjusted in a range of 20-50% of the inner diameter D4 of the shell of the reactor or heat exchanger, and the inside diameter D2 of the region in which the tubes are present, is preferably adjusted such that the distance from the second disc-type baffle plate, i.e., (D2−D1)/2, is 50-500 mm or in a range of 0.5-10% of D4, and the distance from the doughnut-type baffle plate, i.e., (D3−D2)/2, is 200-1000 mm or in a range of 3-20% of D4.

Also, the present invention provides a method for increasing the heat transfer coefficient of tubes in a shell-and-tube reactor or heat exchanger alternately comprising a doughnut-type baffle plate and a first disc-type baffle plate, in which the tubes are provided in a region inside of the doughnut-type baffle plate, the region having present therein a flow of heat transfer medium parallel to the axis of the tubes (parallel flow), and in which a first object for heat transfer with the heat transfer medium is passed through the inside of the tubes, the method comprising placing a second disc-type baffle plate in said region to increase the flow rate of the parallel heat transfer medium flow.

Furthermore, the present invention provides a method for producing an oxide, comprising: using said shell-and-tube reactor or heat exchanger, and causing a catalytic vapor-phase oxidation reaction in tubes, through the inside of which a first object for heat transfer with a heat transfer medium is passed.

Typical examples of the oxide formed by catalytic vapor-phase oxidation in the tubes include unsaturated aldehyde and/or unsaturated fatty acid.

BRIEF DESCRIPTION OF THE DRAWINGS

FIG. 5 is a graphic diagram showing the internal temperature distribution of reaction tubes in a reactor manufactured in each of Comparative Example 1 and Example 1.

DESCRIPTION OF REFERENCE NUMERALS

Figure 1:
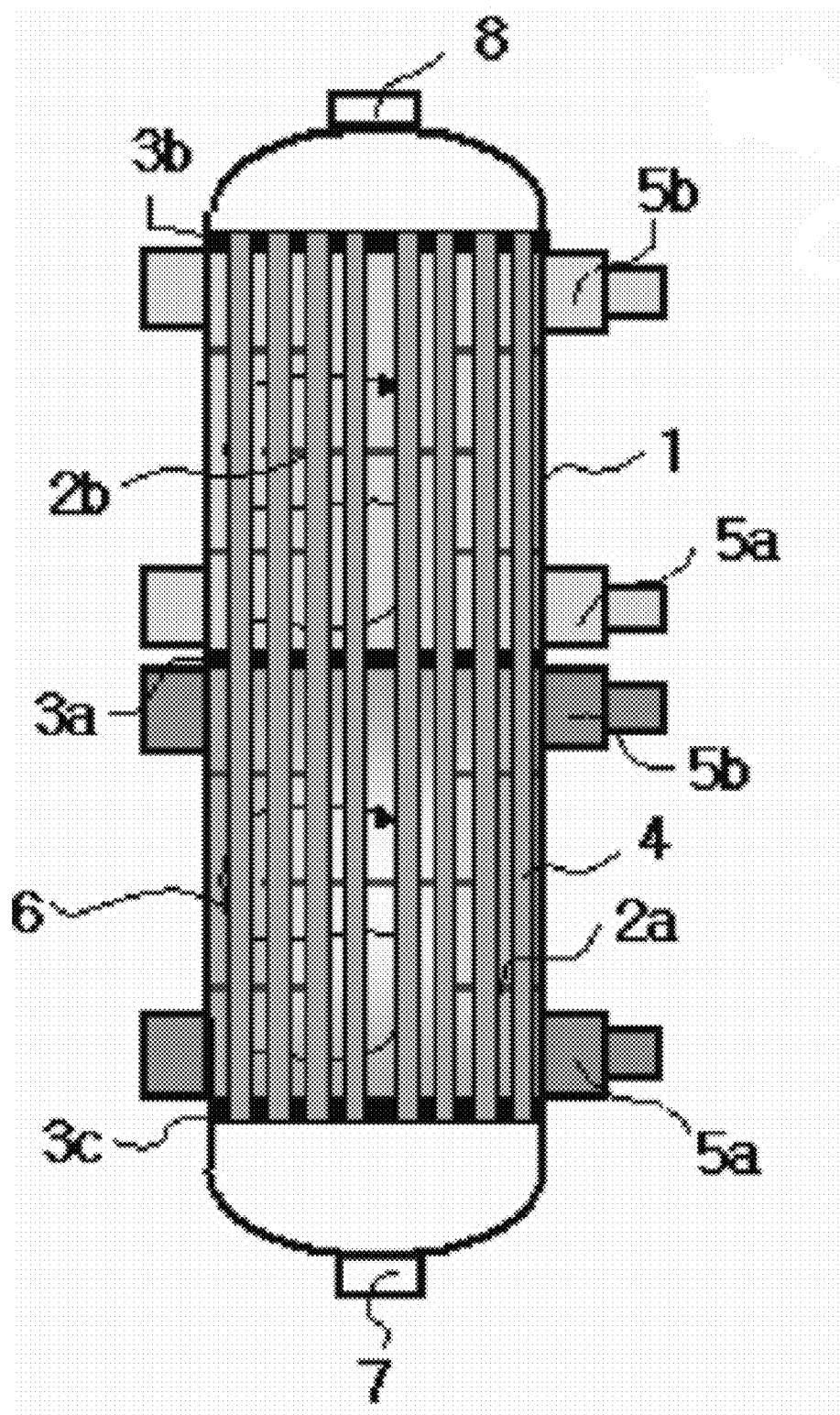
FIG. 1 is a cross-sectional view schematically showing the structure of a prior general shell-and-tube catalytic reactor or heat exchanger.

1: reactor or heat exchanger shell;
2a: doughnut-type baffle plate;
2b: disc-type baffle plate;
2c: disc-type baffle plate placed in the inside center of doughnut-type baffle plate;
3a, 3b and 3c: tube sheets;
4: reaction tubes;
5a: circular conduit into which heat transfer medium is supplied;
5b: circular conduit from which heat transfer medium is discharged;
6: heat transfer medium;
7: reaction gas inlet;
8: reaction gas outlet;
9: region in reactor or heat exchanger, in which reaction tubes are located;
10: inner circle of doughnut-type baffle plate;
11: internal boundary of region in which reaction tubes are located;
12: distribution of heat transfer coefficient in reactor manufactured in Comparative Example 1;
13: distribution of heat transfer coefficient in reactor manufactured in Example 1;
14: internal temperature distribution of reaction tubes in reactor manufactured in Comparative Example 1; and
15: internal temperature distribution of reaction tubes in reactor manufactured in Comparative Example 1.

MODE FOR CARRYING OUT THE INVENTION

Hereinafter, the present invention will be described in detail.

As used herein, the term "tubes" refers to tubes, through the inside of which a first object for heat transfer with a heat transfer medium is passed. In the tubes, a chemical or physical reaction can take place, and can be an exothermic or endothermic reaction. The first object for heat transfer with the heat transfer medium can be a reactant(s) before chemical or physical reaction, a product(s) after the reaction, or a mixture thereof, and may also be an object, which simply performs only heat transfer without any reaction.

The method for improving heat transfer efficiency, suggested in the present invention, can be applied to a system such as a catalytic reactor or a general heat exchanger, which does not aim to perform chemical reactions, the catalytic reactor or the general heat exchanger supplying or discharging fluid such as heat transfer medium, and it is not limited according to the kind of reaction gas in a reactor or the kind of heat transfer medium. In particular, the method according to the present invention is suitable for a shell-and-tube reactor or heat exchanger, which can be used in catalytic vapor-phase oxidation reactions.

Typical examples of catalytic vapor-phase oxidation reactions, to which reactors or heat exchangers having the structure according to the present invention can be applied, include processes of producing unsaturated aldehyde or unsaturated acid from olefin, non-limiting examples of which include a process of producing acrolein and/or acrylic acid by oxidation of propylene or propane, a process of producing (meth) acrolein and/or (meth)acrylic acid by oxidation of isobutylene, t-butylalcohol or methyl-t-butylether, a process of producing phthalic anhydride by oxidation of naphthalene or o-xylene, a process of producing maleic anhydride by partial oxidation of benzene, butylenes or butadiene, and the like.

The present invention has no limitation on the kind of the desired product such as (meth)acryklic acid or (meth)acrolein produced in the reactor, as long as the reactor having the structure according to the present invention is applied.

Hereinafter, the present invention will be described with reference to the use of a shell-and-tube catalytic reactor, but the present invention is not limited to the shell-and-tube catalytic reactor. In the shell-and-tube catalytic reactor, reaction tubes correspond to the tubes, through the inside of which the first object for heat transfer with the heat transfer medium, and reaction gas corresponds to the first object for heat transfer with the heat transfer medium.

The heat transfer medium is a kind of fluid, non-limiting examples of which include highly viscous media, for example, molten salt, which mainly consists of a mixture of potassium nitrate and sodium nitrite. Other examples of the heat transfer medium include phenyl ether media (e.g., "Dowtherm"), polyphenyl media (e.g., "Therm S"), hot oil, naphthalene derivatives (S.K. oil), mercury and the like.

FIG. 1 is a cross-sectional view schematically showing the configuration of a prior shell-and-tube catalytic reactor having a cylindrical structure.

Referring to FIG. 1, the reactor comprises, in a cylindrical shell 1, a plurality of reaction tubes 4 fixed to a plurality of tube sheet 3a, 3b and 3c. The tube sheet 3a located in the middle of the reactor separates the shell into parts and allows reaction temperature to be controlled by an independent heat transfer medium. Each part of the shell includes a circular conduit 5a connected with a heat medium supply duct, and a circular conduit 5b connected with a heat medium discharge duct. A heat transfer medium 6 supplied through the circular conduit 5a connected with the supply duct flows along an S-shaped flow channel, formed by a doughnut-type baffle plate 2a and a disc-type baffle plate 2b, while it heat-exchanges with the reaction tubes 4. The reaction gas is fed through a reaction gas supply duct 7, is passed through the plurality of reaction tubes 4, after which it is collected together and discharged through an outlet duct 8.

Figure 2:
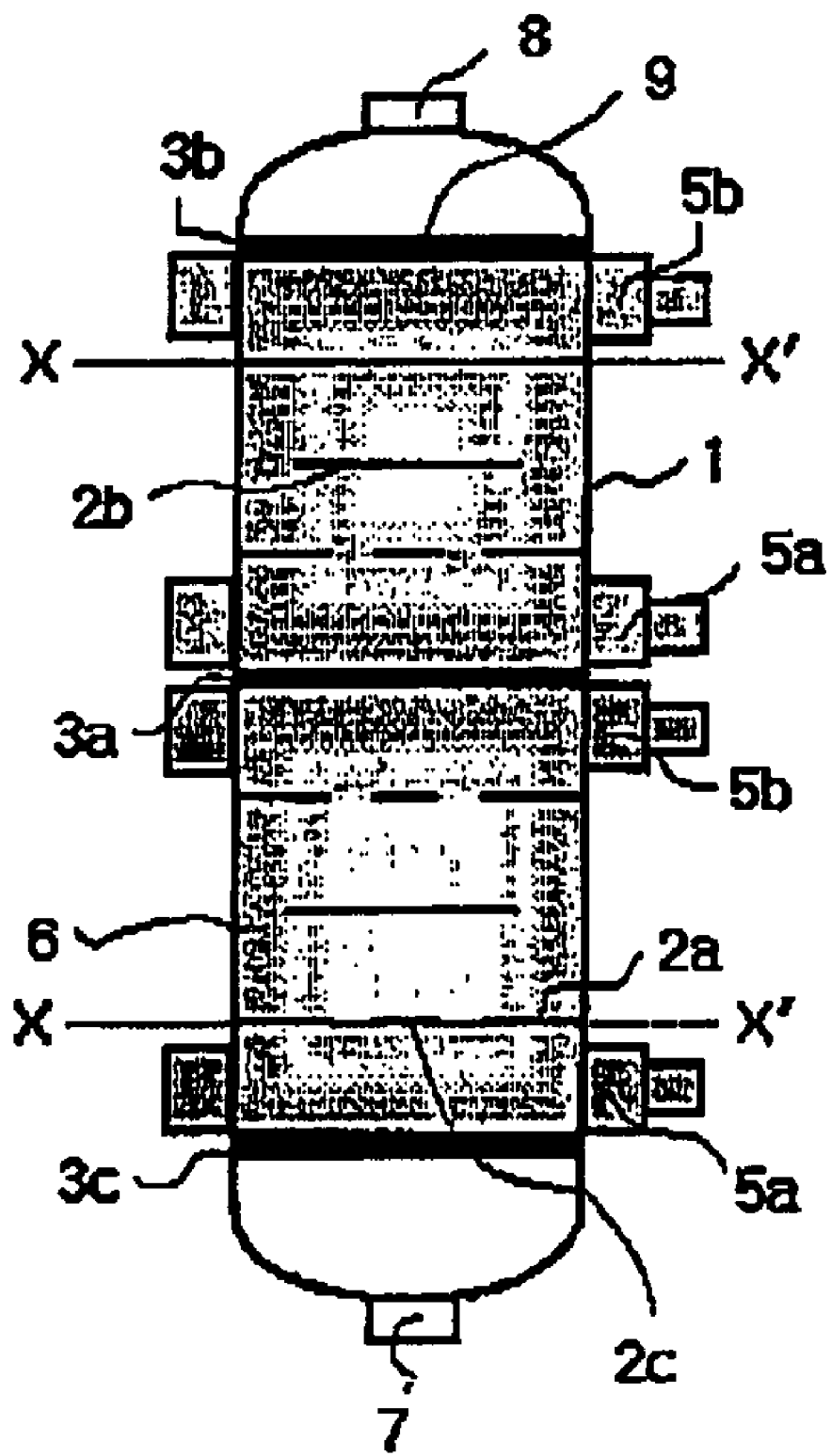
FIG. 2 is a cross-sectional view schematically showing the structure of a reactor or heat exchanger according to the present invention, in which a disc-type baffle plate having a given diameter is placed inside of a doughnut-type baffle plate in order to improve heat transfer efficiency.

A structure comprising a second disc-type baffle plate 2c added to the prior shell-and-tube catalytic reactor of FIG. 1 is shown in FIG. 2. As shown in FIG. 1, a second disc-type baffle plate 2c is placed inside of a doughnut-type baffle in which a heat transfer medium flow parallel to the tube axis (parallel flow) is present, in order to improve heat transfer efficiency according to one embodiment of the present invention. In FIG. 2, a plurality of the reaction tube is not shown in order to show the baffle structure in detail.

Figure 3:
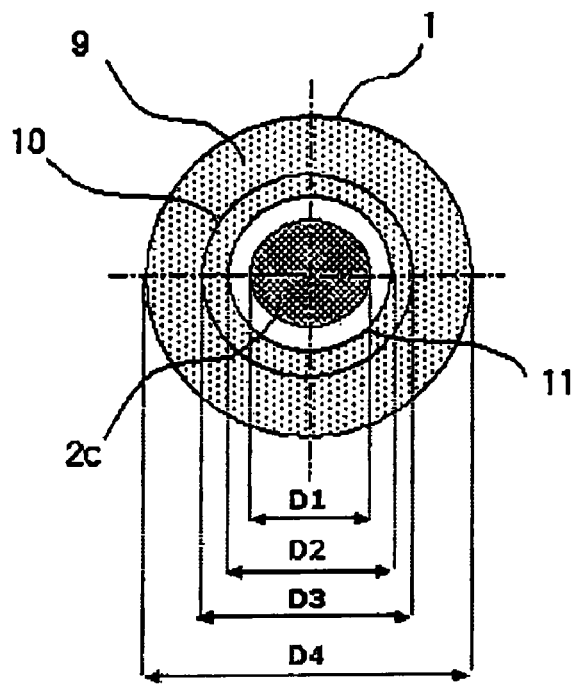
FIG. 3 is a cross-sectional view taken along line X-X' in FIG. 2, which shows the cross section of a reactor or heat exchanger according to an embodiment of the present invention, in which the disc-type baffle plate is placed inside of the doughnut-type baffle plate, and illustrates a reaction tube region, the size of a doughnut-type baffle plate and the size of a disc-type baffle plate placed inside of the doughnut-type baffle plate.

Also, a cross section view taken along line X-X' in FIG. 2 is shown in FIG. 3. In FIG. 3, D4 represents the inner diameter of the reactor shell, D3 the inside diameter of the doughnut-type baffle plate, D2 the inside diameter of a region in which the reaction tubes are present, and D1 the diameter of the second disc-type baffle plate placed inside of the doughnut baffle plate. Also, the relationship of position and size between these members is illustrated in FIG. 3.

Figure 4:
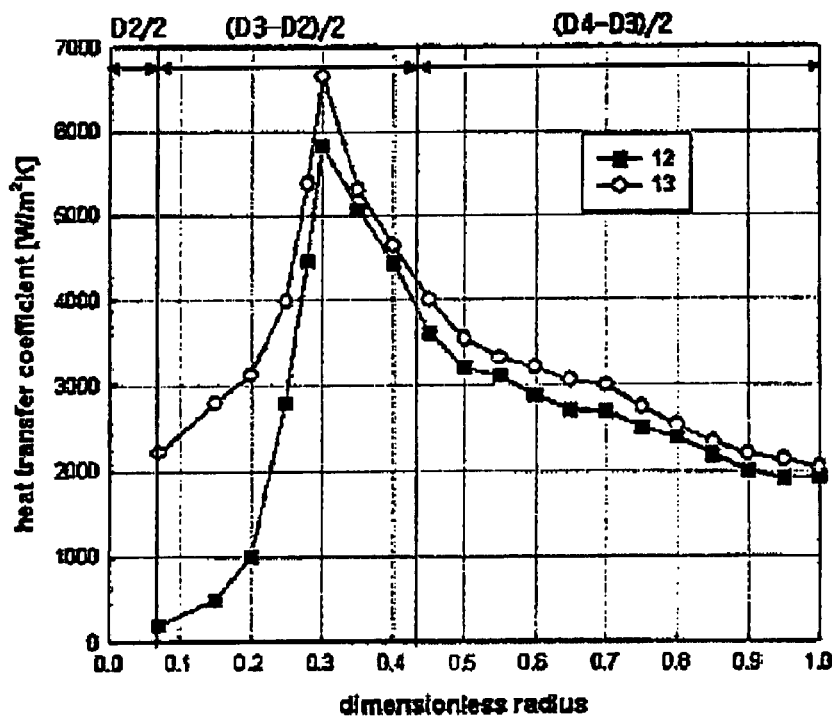
FIG. 4 is a graphic diagram showing the distribution of heat transfer coefficient in a reactor manufactured in each of Comparative Example 1 and Example 1.

FIG. 4 is a graphic diagram showing the comparison between heat transfer coefficient distribution 12 in a prior reactor in which the second disc-type baffle plate is not placed inside of the doughnut-type baffle plate (Comparative Example 1), and heat transfer coefficient distribution 13 in the inventive reactor in which the second disc-type baffle plate is placed inside of the doughnut-type baffle plate (Example 1). The heat transfer coefficient distribution in the inventive reactor is a result obtained along line X-X' in FIG. 2.

As used herein, the term "heat transfer coefficient" refers to the heat transfer coefficient on a tube outer surface, caused by the heat transfer medium passing through the reactor shell.

As shown in FIG. 4, in the prior reactor in which the second disc-type baffle plate is not placed inside of the doughnut-type baffle plate, heat transfer coefficient gradually increases in the inside diameter ($D_3$) of the doughnut-type baffle plate. As it moves toward the central portion, the heat transfer coefficient reaches the highest value at a specific point and then rapidly decreases toward the central portion.

The reason why the heat transfer coefficient gradually increases in the inside diameter of the doughnut-type baffle plate is because the reactor or heat exchanger is cylindrical in shape, and thus a cross-sectional area for the flow of fluid decreases toward the central portion to increase flow rate.

Meanwhile, the reason why the heat transfer coefficient rapidly decreases toward the central portion after it reaches the highest value at a given point in the inside diameter of the doughnut-type baffle plate is because the heat transfer medium no longer forms cross flow across the tubes due to a densely formed tube bundle and is converted to window flow or longitudinal flow along the axis of the tubes, in which the heat transfer coefficient in the case where the reaction tubes are brought into contact with the heat transfer medium in a parallel flow, which is in the same direction as the tube axis, becomes lower than the case where the reaction tubes are brought into contact with the heat transfer medium in a flow vertical to the tube axis.

When the second disc-type baffle plate having a given size (D1) is placed inside of the doughnut-type baffle plate, a unit area for the flow of the heat transfer medium can be decreased to increase the flow rate of the heat transfer medium in the parallel flow, thus effectively increasing the heat transfer coefficient of reaction tubes, which are located inside of the doughnut-type baffle plate and are located close to the central portion of the reactor. The region in which the second disc-type baffle plate is to be located is a region in which the flow of the heat transfer medium is very insignificant. Thus, the region has advantages in that it shows a very low increase in pressure loss, even though the non-reaction tube is placed therein, and the second disc-type baffle plate can reduce the circulating amount of the heat transfer medium.

FIG. 5 is a graphic diagram showing the comparison between the internal temperature distribution 16 of reaction tubes in the prior reactor in which the second disc-type baffle plate is not placed inside of the doughnut-type baffle plate (Comparative Example 1), and the internal temperature distribution 17 of reaction tubes in a novel reactor in which the second disc-type baffle plate is placed inside of the doughnut-type baffle plate (Example 1). The internal temperature distribution of reaction tubes in the novel reactor (Example 1) is a result obtained along line X-X' in FIG. 2. As shown in FIG. 4, the prior reactor, in which the second disc-type baffle plate is not placed inside of the doughnut-type baffle plate, shows a region having a low heat transfer coefficient in reaction tubes located close to the central portion of the reactor, and the region having a low heat transfer coefficient causes hot spots. However, in the case of the reactor in which the second disc-type baffle plate is placed inside of the doughnut-type baffle plate, the heat transfer coefficient of reaction tubes present in the entire internal region of the reactor has a value higher than the minimum value that can effectively remove the internal heat of the reaction tubes, and thus almost similar temperature distributions are shown without causing hot spots. For this reason, the difference in heat transfer efficiency or performance resulting from a local position having parallel flow present therein will not occur, and in the case of the heat exchanger, overall heat transfer performance will be improved. Also, in the case of the reactor, it is possible to inhibit the occurrence of hot spots and increase the yield of the desired product.

The diameter D1 of the second disc-type baffle plate placed inside of the doughnut-type baffle plate is preferably adjusted in a range of 5-25% of the inner diameter D4 of the shell, and more preferably 10-20% of D4.

If the diameter D1 of the second disc-type baffle plate is smaller than 5% of the inner diameter D4 of the shell, the effect of increasing heat transfer efficiency using the second disc-type baffle plate placed inside the doughnut-type baffle plate will be very insignificant, and if it is more than 25%, a space in which the reaction tubes are to be placed will be reduced, leading to an inefficient reactor design.

The inside diameter D3 of the doughnut-type baffle plate is preferably adjusted in the range of 20-50% of the inner diameter D4 of the shell. Also, the inside diameter D2 of the region, in which the reaction tubes are present, is preferably adjusted such that the distance from the second disc-type baffle plate, that is, (D2−D1)/2, is 50-500 mm or in the range of 0.5-10% of D4, and the distance from the doughnut-type baffle plate, that is, (D3−D2)/2, is 200-1000 mm or in the range of 3-20% of D4.

If the length of (D2−D1)/2 is smaller than 50 mm or 0.5% of D4, excessive pressure loss will be required to circulate the heat transfer medium through the shell, resulting in an increase in the capacity of a heat transfer medium-circulating pump and an increase in operating cost. On the other hand, if the length of (D2−D1)/2 is larger than 500 mm or 10% of D4, a space in which the reaction tubes are to be placed will be decreased, leading to an inefficient reactor design.

If the length of (D3−D2)/2 is smaller than 200 mm or 3% of D4, although sufficient heat transfer coefficient can be obtained even if the reaction tubes are located closer to the central portion, the internal space of the reactor cannot be sufficiently utilized, resulting in an inefficient reactor design. On the other hand, if the length of (D3−D2)/2 is larger than 1000 mm or 20% of D4, a possibility for a region having low heat transfer coefficient to occur in the reaction tubes located close to the central portion will be increased, and thus the advantages that are obtained by placing the second disc-type baffle plate cannot be sufficiently obtained.

Meanwhile, the above-described second disc-type baffle plate placed inside of the doughnut-type baffle plate can be manufactured to have a structure described in the present invention by, for example, welding a given size of a disc-type iron plate to a connecting rod or spacer to fix it to the center of the reactor.

Example 1

A reactor, in which a second disc-type baffle plate was placed inside of a doughnut-type baffle plate, as shown in FIG. 2, was manufactured in the following conditions.
  Length of reaction tubes: 3250 mm
  Inner diameter of reactor shell: 4150 mm
  Inside diameter of doughnut-type baffle plate: 1600 mm
  Inside diameter of region in which reaction tubes are present: 500 mm
  Diameter of second disc-type baffle plate placed inside of doughnut-type baffle plate: 300 mm
  Kind of heat transfer medium: molten salt (mixture of potassium nitrate and sodium nitrite)
  Temperature of heat transfer medium: 310° C.
  Kind of reaction gas: mixed gas (mixture of propylene, steam and air)
  Injection temperature of reaction gas: 150° C.

Comparative Example 1

A reactor, in which a second disc-type baffle plate was not placed inside of a doughnut-type baffle plate, was manufactured in the following conditions.
  Length of reaction tubes: 3250 mm
  Inner diameter of reactor shell: 4150 mm
  Inside diameter of doughnut-type baffle plate: 1600 mm
  Inside diameter of region in which reaction tubes are present: 500 mm
  Kind of heat transfer medium: molten salt (mixture of potassium nitrate and sodium nitrite)
  Temperature of heat transfer medium: 310° C.
  Kind of reaction gas: mixed gas (mixture of propylene, steam and air)
  Injection temperature of reaction gas: 150° C.
  <Consideration>

As shown in FIG. 4, in the reactor of Comparative Example 1, in which the doughnut-type baffle plate and the first disc-type baffle plate are alternately arranged without placing the second disc-type baffle plate inside of the doughnut-type baffle plate, a region having significantly reduced heat transfer coefficient was present in the reaction tubes located in the central portion in which the movement direction of the heat transfer medium was changed. Thus, as shown in FIG. 5, in the reaction tubes present in the region having significantly reduced heat transfer coefficient, abnormal hot spots resulting from the reduction in heat transfer efficiency occurred. Such abnormal hot spots increase possibilities for catalysts to deteriorate, leading to a reduction in catalyst life, the selectivity to the desired product to decrease, and run-away reactions to be induced.

The reactor of Example 1, in which the second disc-type baffle plate was placed inside of the doughnut-type baffle plate, had heat transfer coefficient distribution 13 greater than that in the reactor of Comparative Example 1, in which the second disc-type baffle plate was not placed. Thus, the reactor of Examples 1 showed increased heat transfer efficiency. For this reason, the hot spots occurring in the reaction tubes located in the central portion of the prior reactor structure no longer occurred in the reactor, in which the second disc-type baffle plate was placed inside of the doughnut-type baffle plate.

In short, when the second disc-type baffle plate is placed inside of the doughnut-type baffle plate according to the present invention, it is possible to eliminate the problem in that hot spots occur due to a reduction in heat transfer efficiency at a local position in the reaction tubes of the prior reactor, resulting in performance deterioration. Specifically, as shown in FIGS. 4 and 5, in the case of the inventive reactor, all the reaction tubes have heat transfer coefficient higher than a given value to prevent hot spots from occurring therein, and thus a reduction in heat transfer efficiency or performance at a local position does not occur.

INDUSTRIAL APPLICABILITY

As can be seen from the foregoing, the present invention provides the reactor or heat exchanger, which alternately comprises the doughnut-type baffle plate and the first disc-type baffle plate and in which the second disc-type baffle plate is placed in the region inside of the doughnut-type baffle plate, in which the heat transfer medium flows parallel to the axis of the reaction tubes. In the inventive reactor or heat exchanger, the heat transfer efficiency of tubes, such as reaction tubes, placed in said region or near there, can be increased without a great increase in pressure loss. Thus, all the tubes can have heat transfer coefficients higher than a given value to prevent hot spots from occurring therein. Thus, a reduction in heat transfer efficiency or performance at a local position does not occur. Accordingly, in the case of the heat exchanger, it is possible to increase overall heat transfer performance, and in the case of the reactors it is possible to inhibit the occurrence of hot spots and increase the yield of the desired product.

Accordingly, in the reactor having the structure suggested in the present invention, (meth)acrylic acid and/or (meth) acrolein can be obtained with increased yield by catalytic vapor-phase oxidation of gas including propylene or isobutylene through a more stable operation in a smaller circulation amount of a heat transfer medium using a smaller amount of energy.

Although the preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:
1. A shell-and-tube reactor or heat exchanger comprising:
  a doughnut-shaped baffle plate,
  a first disc-shaped baffle plate, the doughnut-shaped baffle plate and the first disc-shaped baffle plate being alternately disposed in a vertical direction of the reactor or heat exchanger,
  a second disc-shaped baffle plate, which is placed in an empty space inside of the doughnut-shaped baffle plate, and
  tubes, through an inside of which a first object for heat transfer with a heat transfer medium is passed, and which are present in a region inside of the doughnut-shaped baffle plate and outside of the second disc-shaped baffle plate, wherein a diameter D1 of the second disc-shape baffle plate is in a range of 10-20% of an inner diameter D4 of a shell of the reactor or heat exchanger.

2. The shell-and-tube reactor or heat exchanger of claim 1, wherein an inside diameter D3 of the doughnut-shaped baffle plate is in a range of 20-50% of the inner diameter D4 of the shell of the reactor or heat exchanger.

3. The shell-and-tube reactor or heat exchanger of claim 1, wherein an inside diameter D2 of the region, in which the tubes are present, is adjusted such that a distance from the second disc-shaped baffle plate, equal to, (D2−D1)/2, is in a range of 0.5-10% of the inner diameter D4 of the shell of the reactor or heat exchanger, and a distance from the doughnut-shaped baffle plate, equal to, (D3−D2)/2, wherein D3 is an inside diameter of the doughnut-shaped baffle plate, is in a range of 3-20% of D4.

4. The shell-and-tube reactor or heat exchanger of claim 1, wherein the first object for heat transfer with the heat transfer medium is a reactant(s) before a chemical reaction, a product(s) after the chemical reaction, or a mixture thereof.

5. A method for producing an oxide, comprising:
using a shell-and-tube reactor or heat exchanger set forth in claim 1, which alternately comprises a doughnut-shape baffle plate, a first disc-shape baffle plate, a second disc-shape baffle plate, which is placed in an empty space inside of the doughnut-shape baffle plate, and tubes, through the inside of which a first object for heat transfer with a heat transfer medium is passed, and which are present in a region inside of the doughnut-shape baffle plate and outside of the second disc-shape baffle plate, wherein a diameter D1 of the second disc-shape baffle plate is in a range of 10-20% of an inner diameter D4 of a shell of the reactor or heat exchanger; and
causing a catalytic vapor-phase oxidation reaction in tubes.

6. The method of claim 5, wherein the oxide is unsaturated aldehyde or unsaturated fatty acid.

7. The method of claim 5, wherein an inside diameter D3 of the doughnut-shape baffle plate is in a range of 20-50% of the inner diameter D4 of the shell of the reactor or heat exchanger.

8. The method of claim 5, wherein an inside diameter D2 of the region, in which the tubes are present, is adjusted such that the distance from the second disc-shape plate, equal to, (D2-D1)/2, is in a range of 0.5-10% of an inner diameter D4 of the shell of the reactor or heat exchanger, and a distance from the doughnut-shape baffle plate, equal to, (D3-D2)/2, wherein D3 is an inside diameter of the doughnut-shape baffle plate, is in a range of 3-20% of D4.

* * * * *